United States Patent Office 3,048,565
Patented Aug. 7, 1962

3,048,565
POLYESTER HAVING BASIC DYE SITES
Walter G. Gall and Ivan Maxwell Robinson, Wilmington, Del., assignors to E. I. du Pont de Nemours and Company, Wilmington, Del., a corporation of Delaware
No Drawing. Filed Dec. 21, 1959, Ser. No. 860,729
9 Claims. (Cl. 260—75)

This invention relates to a film- and fiber-forming synthetic copolyester and the shaped articles produced therefrom. More particularly it is concerned with a fiber-forming copolyester containing a minor proportion of a basic dye sensitizing unit as defined hereinafter and shaped articles formed therefrom.

It is an object of the present invention to provide synthetic linear copolyesters of high molecular weight, from which tough molded articles, fibers, films and other shaped articles may be formed.

Another object is to provide a shaped article produced from a copolyester, the said article having affinity for basic type dyes.

A further object is to provide a process for the production of a copolyester from which shaped articles having affinity for basic type dyes can be prepared.

These and other objects will become apparent in the course of the following specification and claims.

The polymer of the present invention is useful in the production of shaped articles, which may be made in one or more steps beginning with the extrusion or molding of the molten polymer. Among such useful articles are yarns and fabrics, films, bristles, gears and other mechanical parts, pipes, foams, reinforced objects, ornaments, and molded electrical insulation parts.

In accordance with the present invention a copolyester is provided having a repeating unit of components defined by the formulae:

$$[-O-(X)_n-O-]_{90-99.75} \quad (a)$$

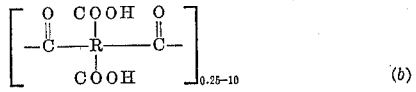
$(b)$ wherein —X— is a bivalent radical of a hydroxyl terminated linear synthetic polyester of the formula $$HO-(X)_n-OH \quad (c)$$

$n$ being a number sufficiently large so that the said hydroxyl terminated polyester has an intrinsic viscosity of at least about 0.3, the numerical parenthetical subscripts in the formulae indicating the mol percentage ranges of each radical component $(a)$ and $(b)$ in the said repeating unit, the sum total of the mol percentages of $(a)$ and $(b)$ being 100 and

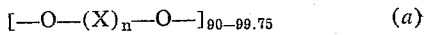

is a divalent organic radical, the attached carboxyl groups being substituted upon different carbons forming the said radical. The radical

may be any organic radical, but is generally a radical selected from the class consisting of hydrocarbons and halogen-substituted hydrocarbons. Radicals containing ether linkages and other relatively inert linkages may also be employed. Preferably the radical

is an aromatic hydrocarbon.

A polymer as described above is prepared by contacting the melt of a synthetic linear condensation polyester in which the end groups are predominantly hydroxyl and which has an inherent viscosity of at least about 0.3 with a minor amount of a dianhydride of the formula

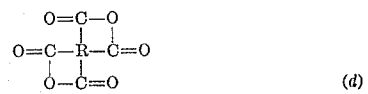
$(d)$ wherein

is as defined previously, and maintaining the molten reactants in contact for no longer than about 30 minutes, during which period the desired shaped article is formed and thereafter cooled. A typical embodiment is expressed in the equation:

("—O—(X)$_n$—O—" of $(c)$ above corresponding to "(—OGOOCACO)$_m$OGO—"). In the formulae of the equation G and A are divalent organic radicals corresponding, respectively, to the radicals in the initial glycol, G(OH)$_2$, and in the initial dicarboxylic acid, A(COOH)$_2$, and $m$ is a number sufficiently large that the polyester has an inherent viscosity of at least about 0.3, preferably 0.5 or higher. As is apparent, in the reaction each of the anhydride groups reacts with a hydroxyl end group of a polyester chain with simultaneous formation of a carboxylic acid group. The carboxylic acid groups do not enter into the reaction provided the reaction time is maintained within the thirty minute limit, since the acid groups react more slowly than do the anhydride groups, and the number of hydroxyl groups available for reaction is relatively limited.

The following examples will serve to illustrate the invention, although they are not intended to be limitative. Reference to the following definitions and explanations of terms will serve to facilitate an understanding of the invention, and the description and claims herein are to be construed in accordance with such definitions and explanations.

The inherent viscosity of the polymer, denoted by the symbol $\eta_{inh}$, is used herein as a measure of the degree of polymerization of the polymer and may be defined as $$\eta_{inh} = \frac{\ln(r)}{C}$$

wherein $r$ is the viscosity at 25° C. of a dilute solution of the polymer divided by the viscosity of the solvent measured in the same units at the same temperature; and C is the concentration in grams of the polymer per 100 ml. of solution. A convenient solvent for polyesters, especially polyethylene terephthalate and copolyesters thereof, is Fomal, which comprises 58.8 parts by weight of phenol and 41.2 parts by weight of trichlorophenol, and inherent viscosity values reported herein are with reference to this solvent. A concentration of about 0.5 gram of polymer per 100 ml. of solution is convenient for performing inherent viscosity determinations.

The concentration of carboxylic acid groups in a polymer is determined by dissolving a weighed sample of the polymer is a hot mixture of benzyl alcohol and chloroform, cooling the solution, and titrating with standard caustic solution. The results are reported in terms of equivalents of carboxyl per million grams of polymer.

The Izod impact test on notched bars of polymer, an accepted measure of the toughness of the polymer, is carried out in accordance with the standard procedure of A.S.T.M. test D256-47T. In another test of the toughness of the polymers, crystalline bars of the type used in the Izod impact test are bent double, i.e., bent upon themselves through an angle of 180° so that the ends of the bars are brought parallel. This test is a measure of the brittleness of the crystalline polymer, since brittle polymers break when subjected to this simple test.

Fabric dyeing carried out in accordance with the procedures used herein are performed by immersion at 125° C. in aqueous solutions of the dye containing 3% of the dye, based on the weight of the fabric treated, for one hour.

Polyethylene terephthalate is prepared in accordance with the general procedure described in United States Patent 2,465,319 to Whinfield and Dickson, in which dimethyl terephthalate (46.2 parts) and ethylene glycol (30.6 parts) are heated together until the evolution of methanol ceases, following which the mixture is heated at elevated temperature and reduced pressure with evolution of glycol until polyethylene terephthalate having the desired inherent viscosity is attained. The catalyst used to facilitate the reaction comprises 0.045% of manganous acetate·2.5 hydrate and 0.03% antimony trioxide, based on the weight of dimethyl terephthalate. Polyethylene terephthalate/isophthalate (85/15) is prepared in the same manner as polyethylene terephthalate, except that only 39.3 parts of dimethyl terephthalate is used and 6.9 parts of dimethyl isophthalate are added; while polyethylene terephthalate/sebacate (75/25) is prepared using only 34.6 parts of dimethyl terephthalate with the addition of 13.7 parts of dimethyl sebacate. Similarly, polybutylene terephthalate is prepared by substituting 44.4 parts of 1,4-butanediol for the ethylene glycol. Polyethylene hexahydroterephthalate is prepared by reacting 47.6 parts of dimethyl hexahydroterephthalate with 30.6 parts of ethylene glycol, and polyethylene 2,6-naphthalene dicarboxylate is prepared by reacting 30.6 parts of ethylene glycol with 58.1 parts of dimethyl 2,6-naphthalene dicarboxylate, using in each case the same catalyst employed for preparing polyethylene terephthalate. Polyethylene p-oxybenzoate is prepared by the self-condensation of 15 parts of methyl p-(2-hydroxy ethoxy)benzoate in the presence of 0.05 part tetraisopropyl titanate. Poly(p-hexahydroxylene terephthalate) is prepared by reacting 97 parts of dimethyl terephthalate with 151 parts of p-hexahydroxylene glycol in the presence of 0.08 part of tetraisopropyl titanate.

EXAMPLE I 4.12 parts of solid pyromellitic dianhydride is thoroughly mixed in a ball mill with 250 parts of dried polyethylene terephthalate flake having an inherent viscosity of 0.86. This concentration of pyromellitic dianhydride is equivalent to approximately 1.45 mol percent of the terephthalate content of the polymer. In a series of tests, samples of the mixture are melted at 285° C. and double bars having the dimensions 2.5" x 0.5" x 0.125" are prepared by injection molding into dies maintained at 60° C., the residence time of the polymer in the injection apparatus at 285° C. being about 10 minutes. The modified polyester is found to have an inherent viscosity of 1.3. The Izod impact strength of a notched bar crystallized by heating in an oven at 150° C. for 4 hours is 0.60 ft. lbs./in. Another crystallized bar is bent double, so that the ends of the bar are brought parallel, without breaking. When the residence time of the polymer in the injection apparatus is increased to 40 minutes, however, and the bar is subsequently crystallized in the same manner, it is found that the bar breaks when an attempt is made to bend it double. Bars are also prepared from the unmodified polyethylene terephthalate flake having an inherent viscosity of 0.86 by melting the polymer at 285° C. and injection molding into a die with a residence time of the polymer in the apparatus at 285° C. of 10 minutes. Bars of the unmodified polymer, when crystallized by heating at 150° C. for 4 hours, have an Izod impact strength of only 0.30 ft. lbs./in., and it is found that the bars break when an attempt is made to bend them double.

In another experiment, powdered polyethylene terephthalate having an inherent viscosity of 0.86 is subjected to "powder polymerization" by supporting it in a vertical tube and passing dry nitrogen at 240° C. upwards through the polymer for a total of 14 hours divided into two periods of 6 and 8 hours' duration, respectively, with intermediate cooling. The powder-polymerized polyethylene terephthalate has an inherent viscosity of 2.21; however, the inherent viscosity of the polymer drops to 1.04 when it is held in the molten state at 280° C. for 10 minutes. 175 parts of the powder-polymerized polymer is thoroughly mixed in a ball mill with 1.23 parts of pyromellitic dianhydride, a concentration equivalent to 0.62 mol percent of the terephthalate content of the polymer. In a series of tests, samples of the mixture are melted at 285° C. and double bars of the modified polymer are prepared by injection molding into a die maintained at 70° C., the residence time of the polymer in the injection apparatus at 285° C. being about 10 minutes. The modified polyester is found to have an inherent viscosity of 1.87. The Izod impact strength on a notched bar of the modified polyester crystallized by heating in an oven at 150° C. for 4 hours is 0.97 ft. lbs./in.; and it is found that the crystallized bars can be bent double without breaking. When the bar of the modified polyester is crystallized at 125° C. for 16 hours, the Izod impact strength is 1.11 ft. lbs./in. When the residence time of the polymer in the injection apparatus is increased to 40 minutes, however, and the bar is subsequently crystallized at 150° C. for 4 hours, it is found that the bar breaks when an attempt is made to bend it double. Bars are also prepared by injection molding the unmodified powder-polymerized polyethylene terephthalate by melting the polymer at 285° C. and injection molding into a die with a residence time of the polymer in the apparatus at 285° C. for 10 minutes. Bars of the polymer, when crystallized by heating at 150° C. for 4 hours, have an Izod impact strength of only 0.65 ft. lbs./in., and it is found that the bars break when an attempt is made to bend them double.

In a further experiment, 20 parts of polyethylene terephthalate flake having an inherent viscosity of 0.2 is mixed with 0.33 part of pyromellitic dianhydride, a concentration equivalent to 1.45 mol percent of the terephthalate content of the polymer. The mixture is melted at 270° C. and maintained at that temperature for a period of 30 minutes. The polymer is then cooled and an attempt is made to ascertain its inherent viscosity; however, it is found to be insoluble in Fomal, apparently as a result of crosslinking.

EXAMPLE II 7.63 parts of solid pyromellitic dianhydride is thoroughly mixed in a ball mill with 227 parts of dried polyethylene terephthalate flake having an inherent viscosity of 0.64 and the mixture is dried 2 hours under vacuum at 150° C. This concentration of pyromellitic dianhydride is equivalent to approximately 3 mol percent of the terephthalate content of the polymer. The mixture is melted and spun at 280° C. through a 34-hole spinneret plate in which the orifices have diameters of 0.009 inch, using a standard filter pack comprising sand supported by a screen assembly as described by Hull et al., in United States Patent 2,266,368. The yarn is wound up at a speed of approximately 1200 yds./min. The maximum hold-up time of the polymer in the molten state is about 10 minutes. The yarn is drawn 2.77 times its extruded length to produce a 100 denier yarn having a tenacity of 3.6 grams/denier and an elongation of 24.3%. A swatch of knit tubing prepared from this yarn is dyed with Victoria Pure Blue BO dye (Pr. No. 198). The fabric is dyed a deep blue color. A comparative control sample of a fabric prepared from unmodified polyethylene terephthalate yarn adsorbs virtually none of the dye.

When the example is repeated with increased holdup time of the modified polymer in the molten state at 280° C. prior to spinning from the same spinneret pack assembly, it is found that the spinning of filaments becomes more difficult as the hold-up time is increased. When the hold-up time exceeds 30 minutes, spinning can no longer be accomplished, apparently as a result of cross-linking in the modified polymer.

The carboxylate-modified yarn prepared as described above is dyed a deep shade of bluish red by Fuchsine SBP dye (C.I. No. 676) and a medium shade of blue by a basic dye of the oxazine type having the following chemical structure:

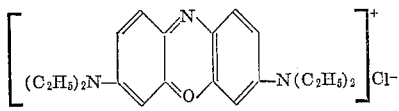

Control samples of fabric prepared from unmodified polyethylene terephthalate yarn adsorb virtually none of either of these dyes.

The experiment is repeated using 2.62 parts of pyromellitic dianhydride, corresponding to approximately 1 mol percent based on the terephthalate content of the polymer, the maximum hold-up time of the polymer in the molten state being about 10 minutes. Yarn spun from this blend is also dyed a deep shade of blue with Victoria Pure Blue BO dye and a deep shade of bluish red with Fuchsine SBP dye. Upon analysis of the yarn, the polymer of which it is composed is found to contain 115.3 equivalents of carboxyl per million grams of polymer. Similar dyeability is obtained by repeating the experiment using 4.80 parts of pyromellitic dianhydride, corresponding to approximately 2 mol percent, based on the terephthalate content of the polymer. This yarn is found to contain 210.3 equivalents of carboxyl per million grams of polymer.

Copolyesters of similar high sensitivity to basic dyes are produced by reacting pyromellitic dianhydride with polyethylene terephthalate/isophthalate (85/15) having an inherent viscosity of 0.6 or with polyethylene terephthalate/sebacate (75/25) of the same inherent viscosity in accordance with the procedure described above.

In a control experiment, the polyethylene terephthalate starting material is held in the melt at 285° C. for approximately 24 hours, a known method of degrading the polymer to produce it in a high concentration of "terminal" (as contrasted to "mid-chain") carboxyl groups. Flake composed of this polymer, which is found to have an inherent viscosity of 0.32, is melted and extruded into yarn under conditions similar to the above. Upon analysis of this yarn, the polymer of which it is composed is found to have 208.0 equivalents of carboxyl per million grams of polymer. However, swatches of knit tubing prepared from this yarn do not exhibit any significant dye up-take when dyed with Fuchsine SBP dye under the same dye bath conditions described above.

EXAMPLE III 1.74 parts of solid butane-1,2,3,4-tetracarboxylic dianhydride is thoroughly mixed in a ball mill with 110 parts of dried polybutylene terephthalate flake having an inherent viscosity of 0.5 and the mixture is dried 2 hours under vacuum at 100° C. The concentration of the dianhydride is accordingly equivalent to approximately 2 mol percent of the terephthalate content of the polymer. The mixture is melted and a film is pressed from molten material with a hold-up time of the polymer in the molten state of about 5 minutes. When the film is treated for 2 hours at 100° C. with an aqueous solution of 3% (based on the weight of the film) of Fuchsine SBP dye, the film is dyed a medium shade of bluish red. A film pressed from a control sample of unmodified polybutylene terephthalate is dyed only a pale shade of pink with Fuchsine SBP dye under the same conditions.

EXAMPLE IV 3.36 parts of solid cyclohexane-1,2,3,4-tetracarboxylic dianhydride is thoroughly mixed in a ball mill with 100 parts of dried polyethylene hexahydroterephthalate flake having an inherent viscosity of 0.64 and the mixture is dried 2 hours under vacuum at 100° C. The concentration of the dianhydride is accordingly equivalent to approximately 3 mol percent of the hexahydroterephthalate content of the polymer. The mixture is melted and a film is pressed from molten material with a hold-up time of the polymer in the molten state of about 5 minutes. When the film is treated for 2 hours at 100° C. with an aqueous solution of 3% (based on the weight of the film) of the oxazine dye of Example II, the film is dyed a medium shade of blue. A film pressed from a control sample of unmodified polyethylene hexahydroterephthalate is dyed only a faint shade of blue with the oxazine dye under the same conditions.

EXAMPLE V 2.17 parts of solid bromopyromellitic dianhydride is thoroughly mixed in a ball mill with 82 parts of dried polyethylene p-oxybenzoate flake having an inherent viscosity of 0.3 and the mixture is dried 2 hours under vacuum at 150° C. The concentration of the dianhydride is accordingly equivalent to approximately 2 mol percent of the p-oxybenzoate content of the polymer. The mixture is melted and a film is pressed from molten material with a hold-up time of the polymer in the molten state of about 5 minutes. When the film is treated for 2 hours at 100° C. with an aqueous solution of 3% (based on the weight of the film) of Victoria Pure Blue BO dye, the film is dyed a medium shade of blue. A film pressed from a control sample of unmodified polyethylene p-oxybenzoate is dyed only a faint shade of blue with Victoria Pure Blue BO dye under the same conditions.

EXAMPLE VI 4.41 parts of solid diphenyl-2,3,5,6-tetracarboxylic dianhydride is thoroughly mixed in a ball mill with 123 parts of dried poly(p-hexahydroxylylene terephthalate) flake having an inherent viscosity of 0.65 and the mixture is dried 2 hours under vacuum at 150° C. The concentration of the dianhydride is accordingly equivalent to approximately 3 mol percent of the terephthalate content of the polymer. The mixture is melted and a film is pressed from molten material with a hold-up time of the polymer in the molten state of about 5 minutes. When the film is treated for 2 hours at 100° C. with an aqueous solution of 3% (based on the weight of the film) of Fuchsine SBP dye, the film is dyed a medium shade of bluish red. A film pressed from a control sample of unmodified poly(p-hexahydroxylylene terephthalate) is dyed only a pale shade of pink with Fuchsine SBP under the same conditions.

EXAMPLE VII 1.34 parts of solid naphthalene-2,3,6,7-tetracarboxylic dianhydride is thoroughly mixed in a ball mill with 121 parts of dried polyethylene 2,6-naphthalenedicarboxylate flake having an inherent viscosity of 0.58 and the mixture is dried 2 hours under vacuum at 150° C. The concentration of the dianhydride is accordingly equivalent to approximately 2 mol percent of the 2,6-naphthalenedicarboxylate content of the polymer. The mixture is melted and a film is pressed from molten material with a hold-up time of the polymer in the molten state of about 5 minutes. When the film is treated for 2 hours at 100° C. with an aqueous solution of 3% (based on the weight of the film) of the oxazine dye of Example II, the film is dyed a medium shade of blue. A film pressed from a control sample of unmodified polyethylene 2,6-naphthalenedicarboxylate is dyed only a faint shade of blue with the oxazine dye under the same conditions.

EXAMPLE VIII

In each of a series of experiments, the indicated number of parts of the dianhydride modifier of Table I is thoroughly mixed in a ball mill with 227 parts of dried polyethylene terephthalate flake having an inherent viscosity of 0.6 and the mixture is dried 2 hours under vacuum at 100° C. In each case the concentration of dianhydride is equivalent to approximately 3 mol percent of the terephthalate content of the polymer. The mixtures are melted and a film is pressed in each case from the molten material with a hold-up time of the polymer in the molten state of about 5 minutes. The films, when dyed with the oxazine dye of Example II, are dyed in each case to a medium shade of blue. As noted in Example II, unmodified polyethylene terephyhalate is dyed only a faint blue color by the same dye.

Table I
DIANHYDRIDE MODIFIERS MELT BLENDED WITH POLYETHYLENE TEREPHTHALATE

| | Parts modifier |
|---|---|
| Diphenyl-2,3,2′,3′-tetracarboxylic dianhydride | 10.4 |
| Carboxymethanetriacetic dianhydride | 6.2 |
| Methanetetra-acetic dianhydride | 6.7 |
| Cyclobutane-1,3-dicarboxylic-2,4-diacetic dianhydride | 7.1 |
| Cycloheptane-1,2,4,6-tetracarboxylic dianhydride | 8.4 |

Other thermally stable dianhydrides may be substituted for pyromellitic dianhydride in the above examples. Among such anhydrides are naphthalene-1,4,5,8-tetracarboxylic dianhydride, diphenyl-3,4,3′,4′-tetracarboxylic dianhydride, butane-1,2,3,4-tetracarboxylic dianhydride, benzene-1,2,3,4-tetracarboxylic dianhydride, chloropyromellitic dianhydride, dichloropyromellitic dianhydride, perylene-3,4,9,10-tetracarboxylic dianhydride, and 2,2-bis(3,4-dicarboxyphenyl)propane dianhydride. The modified polyesters should contain between about 0.25 and about 10 mol percent of the recurring structural unit derived from the dianhydride, based on the mols of recurring ester structural units (such as the recurring ethylene terephthalate structural unit in polyethylene terephthalate). Polyesters containing less than about 0.25 mol percent of the recurring structural unit derived from the dianhydride usually have only a relatively low affinity for basic dyes. Polyesters containing about 10 mol percent of the modifier have a very high affinity for basic dyes, and higher concentrations do not lead to appreciable increases in dyeability. Concentrations of 0.5 to 5 mol percent of the modifier are regarded as optimum and are preferred. The addition of the modifier does not introduce color into the polyester, an important advantage since colorless or white polyesters are required for textile end uses.

As illustrated in the examples, the product of the present invention comprises a synthetic linear condensation copolyester containing a minor proportion of recurring units of the structure

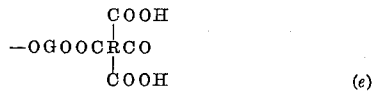

(e)

where R and G are as defined above. The copolyesters are found to have higher viscosity, indicative of increased molecular weight, as compared with the unmodified polyesters from which they are derived. The copolyesters are readily crystallized with the aid of heat, and shaped articles composed of the crystalline copolyesters exhibit enhanced toughness. Furthermore, the copolyesters also have a very high affinity for basic type dyes.

In a preferred embodiment of the invention, a dialkyl ester of terephthalic acid and an excess of polymethylene glycol having the formula $HO(CH_2)_pOH$, wherein $p$ is an integer of from 2 to about 10, are reacted to form a polyester in which the end groups are predominantly hydroxyl groups and the inherent viscosity of the polyester is at least about 0.3, preferably 0.5 or higher. A minor proportion of the dianhydride, $R[(CO)_2O]_2$, is then added to the polyester and the mixture is formed into the desired shaped articles with no more than about 30 minutes hold-up time in the molten state. The product is a copolyester containing in the polymer molecule at least 90 mole percent of recurring units of the structure

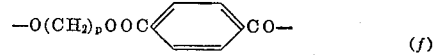

(f)

and from 0.25 to 10 mol percent of recurring units of the structure

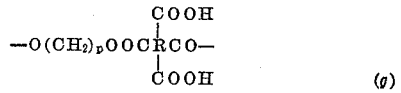

(g)

where $p$ and R are defined as above. Preferably, the polyester contains between about 0.5 mol percent and 5 mol percent of the recurring carboxyl-carrying units.

Other fiber-forming, water-insoluble polyesters which may be modified in accordance with the present invention with modifiers as described herein as well as mixtures thereof, are polyethylene bibenzoate, prepared by condensing ethylene glycol with p,p′-bibenzoic acid; polyethylene 1,5- or 2,7-naphthalenedicarboxylate, prepared by condensing ethylene glycol with dimethyl 1,5- or 2,7-naphthalenedicarboxylate; polyhexamethylene adipate, prepared by condensing hexamethylene glycol with diethyl adipate; and polyethylene sebacate, prepared by condensing ethylene glycol with dimethyl sebacate. The invention is applicable as well to polyesters produced by the self-condensation of monohydroxy carboxylates such as ethyl 4-(beta-hydroxyethoxy)-3-methyl-benzoate, in the presence of a small quantity of a glycol. Polyesters in which at least about 75% of the repeating structural units contain a carbocyclic ring constitute a preferred species for use with the dianhydride modifiers of the invention. The additives may also be incorporated into copolyesters, prepared by reacting a glycol with a mixture of dicarboxylic esters or a dicarboxylic ester with a mixture of glycols. The modified polyesters are highly useful as dyeable textile fibers when spun in accordance with known methods. The modified polyesters may also be extruded into films which are highly receptive to basic coloring materials in printing or dyeing. Ribbons and other useful shaped articles may also be prepared by known methods.

It is necessary to form the desired shaped articles from the modified polymer with a hold-up time of the polymer in the molten state of no more than about 30 minutes. Preferably, the hold-up time in the molten state is no more than about 15 minutes. Under these conditions the novel product is a substantially linear copolyester. When the hold-up time exceeds 30 minutes, however, the polyester begins to change in character so that it is no longer substantially linear, as indicated by the fact that when the modified polymer is heated in the molten state for more than 30 minutes it can no longer be spun into filaments from a standard spinneret pack. The change in the character of the modified polymer after about 30 minutes in the melt is also shown by the properties of crystalline bars of the polymer. As shown in the examples, crystalline bars formed with only a short hold-up time of the polymer in the melt can be bent double without breaking while crystalline bars formed after more than 30 minutes in the melt are more brittle and cannot be bent double without breaking. The change in the character of the polymer is attributable to cross-linking through the carboxylic acid groups in the radical

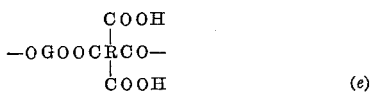
(e)

which begin to enter into the reaction when the reaction is unduly prolonged.

In accordance with the present invention, the initial polyester which is reacted with the dianhydride has an inherent viscosity of at least about 0.3. Preferably, the inherent viscosity is at least about 0.5, especially when it is desired to spin the modified polymer into filaments using a standard spinneret pack assembly. When a polyester having an inherent viscosity of less than about 0.3 is used, the number of hydroxyl groups in the polyester is quite high, and it is difficult to control the reaction to prevent cross-linking through the carboxylic acid groups in the chain.

As shown in Example II, the dyeability with basic dyes of the modified polyesters of this invention cannot be attributed solely to the increased concentration of carboxylic acid groups in the modified polyesters. In fact, samples of polyethylene terephthalate containing equally high concentrations of carboxylic acid groups produced by other processes have been found to have relatively little affinity for basic type dyes. Such polyesters, which are usually of low molecular weight, are not suitable for the purposes of this invention.

The modified polyesters of the present invention are of higher molecular weight than the polyesters from which they are derived. The concentration of dianhydride additive which will afford the maximum increase in molecular weight varies, depending upon the polyester which is used as the starting material, but the optimum concentration is usually between 0.5 and 5 mol percent. The final product is highly useful for the production of tough shaped articles by injection molding and for the production of films, fibers, and bristles by extrusion.

Various other materials may be present in the reaction mixture. For example, such ester interchange catalysts as salts of calcium, manganese, or lanthanum and such polymerization catalysts as antimony oxide will usually be present. Color inhibitors, such as phosphoric acid and its alkyl or aryl esters, may be used. In addition, pigments, delusterants, or other additives may be present, such as titanium dioxide or barium carbonate.

The yarns produced from the polymer of the present invention are suitable for the usual textile applications. They may be employed in the knitting or weaving of fabrics of all types as well as in the production of nonwoven, felt-like products produced by known methods. Their physical properties closely parallel those of their related polyester fibers. However, they have particular sensitivity toward basic dyes. By a "basic dye" is meant a colored cationic organic substance such as those containing sulfonium, oxonium, or quaternary ammonium functional groups. Among the basic dyes which may be applied to the filament formed in accordance with the present invention may be mentioned Victoria Green WB (C.I. 657); Rhodamine B (C.I. 749); Brilliant Green B (C.I. 662); Victoria Pure Blue BO (Pr. 198) and the like.

Many equivalent modifications of the above will be apparent to those skilled in the art from a reading of the above without a departure from the inventive concept.

This application is a continuation-in-part of United States application 667,272, filed June 21, 1957, now abandoned.

What is claimed is:

1. A linear carbonyl-oxy copolyester consisting essentially of alternating repeating units defined by the formulae:

(a)         (—OGOOCACO—)$_m$ (b) 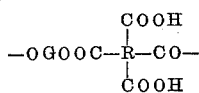

wherein G and A correspond respectively to the organic radicals in the initial glycol, $G(OH)_2$, and in the initial dicarboxylic acid, $A(COOH)_2$, employed in forming the polyester radical (a), wherein G and A are hydrocarbon radicals and R is selected from the group consisting of hydrocarbon and halohydrocarbon radicals and m is a number sufficiently large that the polyester formed by hydroxyl termination of radical (a) has an inherent viscosity of at least about 0.3 in a mixture of 58.8 parts by weight of phenol and 41.2 parts by weight of trichlorophenol, and wherein the four valence bonds of the radical $$-\overset{|}{\underset{|}{R}}-$$

emanate from different carbon atoms of the said radical $$-\overset{|}{\underset{|}{R}}-$$

the said copolyester containing from 0.25 to 10 mol percent of radical component (b), based on the

—OGOOCACO— radical component, with at least 75% of said

—OGOOCACO— radicals containing a carboxylic ring.

2. The copolyester of claim 1 wherein A is paraphylene and G is $(CH_2)_p$ and wherein p is an interger from 2 to 10.

3. The polyester of claim 2 wherein R is

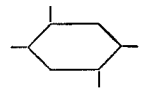

4. A process of forming a dye receptive, linear carbonyl-oxy copolyester which comprises contacting the melt of a synthetic linear condensation polymer having the following structural unit:

(a)         (—OGOOCACO—)$_m$ wherein G and A correspond respectively to hydrocarbon radicals in the initial glycol, $G(OH)_2$, and dicarboxylic acid, $A(COOH)_2$, employed in forming the polyester radical (a), with at least 75% of said —OGOOCACO— radicals containing a carbocyclic ring, and m is a number sufficiently large that the polyester formed by hydroxyl termination of radical (a) has an inherent viscosity of at least about 0.3 in a mixture of 58.8 parts by weight of phenol and 41.2 parts by weight of trichlorophenol, with a minor amount of a dianhydride of the formula

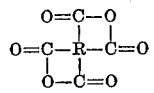

wherein R is selected from the group consisting of hydrocarbon and halohydrocarbon radicals and the four valence bonds of the radical

emanate from different carbon atoms of the same radical and maintaining the molten reactants in contact for no longer than about 30 minutes during which period the desired shaped article is formed and thereafter cooled.

5. The process of claim 4 wherein the synthetic linear condensation polyester is polyethylene terephthalate.

6. The process of claim 4 wherein R is

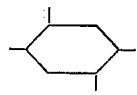

7. The polyester of claim 1 in the form of a fiber.

8. The polyester of claim 1 in the form of a film.

9. The polyester of claim 1 in the form of a molded article.

References Cited in the file of this patent
UNITED STATES PATENTS

| | | |
|---|---|---|
| 2,035,528 | Brubaker | Mar. 31, 1936 |
| 2,437,232 | Rothrock | Mar. 2, 1948 |
| 2,515,758 | Cukier | July 18, 1950 |
| 2,585,323 | Elwell et al. | Feb. 12, 1952 |
| 2,683,135 | Bloch | July 6, 1954 |

UNITED STATES PATENT OFFICE
CERTIFICATE OF CORRECTION

Patent No. 3,048,565                              August 7, 1962

Walter G. Gall et al.

It is hereby certified that error appears in the above numbered patent requiring correction and that the said Letters Patent should read as corrected below.

Column 10, line 42, for "phylene" read -- phenylene --; column 12, lines 2 and 3, strike out "9. The polyester of claim 1 in the form of a molded article."; in the heading to the printed specification, line 7, for "9 Claims." read -- 8 Claims. --.

Signed and sealed this 8th day of January 1963.

(SEAL)
Attest:

ERNEST W. SWIDER                                      DAVID L. LADD
Attesting Officer                                       Commissioner of Patents